United States Patent
Kim

(10) Patent No.: US 10,231,291 B2
(45) Date of Patent: Mar. 12, 2019

(54) HEATING COOKER WITH SAFETY DEVICE FOR MICROWAVE OVEN

(76) Inventor: Jong Hyun Kim, Busan (KR)

(*) Notice: Subject to any disclaimer, the term of this patent is extended or adjusted under 35 U.S.C. 154(b) by 708 days.

(21) Appl. No.: 13/201,105

(22) PCT Filed: Feb. 11, 2009

(86) PCT No.: PCT/KR2009/000642
§ 371 (c)(1),
(2), (4) Date: Nov. 1, 2011

(87) PCT Pub. No.: WO2010/093068
PCT Pub. Date: Aug. 19, 2010

(65) Prior Publication Data
US 2012/0037617 A1 Feb. 16, 2012

(51) Int. Cl.
*H05B 6/80* (2006.01)
*H05B 6/64* (2006.01)
*A47J 27/088* (2006.01)

(52) U.S. Cl.
CPC .......... *H05B 6/6494* (2013.01); *A47J 27/088* (2013.01); *H05B 6/6408* (2013.01)

(58) Field of Classification Search
CPC .. F16J 13/24; F16J 15/48; A47J 27/092; A47J 36/04; A47J 36/025; A47J 36/02; A47G 19/2272
USPC ....... 99/422; 219/730, 759, 732, 725, 573.3, 219/573.2, 573.1, 912; 220/573.3, 573.2, 220/573.1, 912, 240, 316, 203.12; 126/274
See application file for complete search history.

(56) References Cited

U.S. PATENT DOCUMENTS

| | | | | |
|---|---|---|---|---|
| 2,552,642 A | * | 5/1951 | Morrison, Jr. | A47J 27/09 220/203.12 |
| 2,600,714 A | * | 6/1952 | Wenscott | A47J 27/0806 220/298 |
| 3,941,967 A | * | 3/1976 | Sumi et al. | 219/729 |
| 4,276,990 A | * | 7/1981 | Chiodo | B65D 51/1666 220/203.12 |
| 4,306,133 A | * | 12/1981 | Levinson | 219/730 |
| 4,592,479 A | * | 6/1986 | Resende | A47J 27/09 220/203.12 |
| 4,870,233 A | * | 9/1989 | McDonald et al. | 219/730 |
| 5,094,865 A | * | 3/1992 | Levinson | 426/243 |

(Continued)

FOREIGN PATENT DOCUMENTS

| JP | 2-180218 A | 7/1990 |
|---|---|---|
| JP | 02180217 A * | 7/1990 |

(Continued)

*Primary Examiner* — Jimmy Chou
(74) *Attorney, Agent, or Firm* — Birch, Stewart, Kolasch & Birch, LLP

(57) ABSTRACT

A heating cooker for a microwave oven in which in a main body through which microwaves are transmitted, an upper portion of a metallic pan is closely coupled, and a heating sheet receiving the microwaves and generating heat and an insulating support are coupled in order onto an undersurface of the pan, the heating cooker including a safety device configured such that a silicone packing is provided in a section of the close coupling between the pan and the main body, and so that if internal pressure of the cooker rises abnormally, the silicone packing is decoupled from the main body so as to reduce the pressure.

20 Claims, 2 Drawing Sheets

(56) References Cited

U.S. PATENT DOCUMENTS

| | | | | |
|---|---|---|---|---|
| 5,121,852 | A * | 6/1992 | Wilkes | B01D 35/30 |
| | | | | 220/203.09 |
| 5,239,153 | A * | 8/1993 | Beckett | 219/730 |
| 5,387,781 | A * | 2/1995 | Berkoff | 219/735 |
| 5,442,998 | A * | 8/1995 | Niese | 99/337 |
| 5,558,798 | A * | 9/1996 | Tsai | 219/731 |
| 5,586,487 | A * | 12/1996 | Marino | 99/330 |
| 5,641,085 | A * | 6/1997 | Lonbardo | A47J 27/09 |
| | | | | 215/270 |
| 6,050,176 | A * | 4/2000 | Schultheis et al. | 99/339 |
| 6,588,326 | B2 * | 7/2003 | Taplan et al. | 99/422 |
| 6,695,319 | B1 * | 2/2004 | Anota | A47J 27/09 |
| | | | | 220/203.11 |
| 6,705,210 | B2 * | 3/2004 | Leonard | 99/413 |
| 6,747,250 | B1 * | 6/2004 | Cha | 219/400 |
| 7,038,181 | B2 * | 5/2006 | Edmark | 219/689 |
| 7,082,871 | B2 * | 8/2006 | Schultz | 99/337 |
| 7,086,326 | B2 * | 8/2006 | Yokoyama | 99/413 |
| 7,281,715 | B2 * | 10/2007 | Boswell | F24C 15/102 |
| | | | | 219/452.11 |
| 7,614,518 | B2 * | 11/2009 | Barber | 220/23.89 |
| 7,980,171 | B2 * | 7/2011 | Groll | 99/340 |
| 8,096,436 | B2 * | 1/2012 | Rhetat et al. | 220/203.19 |
| 8,124,917 | B2 * | 2/2012 | Friel et al. | 219/439 |
| 8,820,220 | B2 * | 9/2014 | Thelen | A47J 27/09 |
| | | | | 99/337 |
| 2003/0037682 | A1 * | 2/2003 | Dzbinski | 99/422 |
| 2004/0089160 | A1 * | 5/2004 | Doundoulakis | 99/422 |
| 2004/0195230 | A1 * | 10/2004 | Suenaga et al. | 219/390 |
| 2005/0132895 | A1 * | 6/2005 | Seurat Guiochet et al. | 99/337 |
| 2005/0199636 | A1 * | 9/2005 | Liu | A47J 36/02 |
| | | | | 220/644 |
| 2005/0252911 | A1 * | 11/2005 | Regan | 219/607 |
| 2006/0049189 | A1 * | 3/2006 | Golden et al. | 219/725 |
| 2007/0028744 | A1 * | 2/2007 | Osumi | B26D 7/1818 |
| | | | | 83/697 |
| 2007/0084859 | A1 * | 4/2007 | Chen | 219/725 |
| 2008/0315534 | A1 * | 12/2008 | Seurat Guiochet et al. | |
| | | | | 277/647 |
| 2010/0260900 | A1 * | 10/2010 | DeVerney et al. | 426/107 |

FOREIGN PATENT DOCUMENTS

| | | | | |
|---|---|---|---|---|
| JP | 02180218 A | * | 7/1990 | A47J 27/00 |
| JP | 6-67343 B2 | | 8/1994 | |
| KR | 10-2005-0080036 | * | 8/2005 | |
| KR | 10-2005-0080036 A | | 8/2005 | |

* cited by examiner

[Fig. 1]
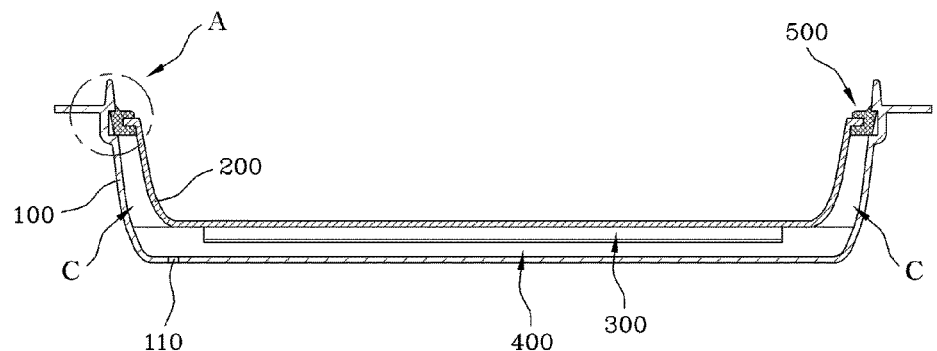
[Fig. 2]
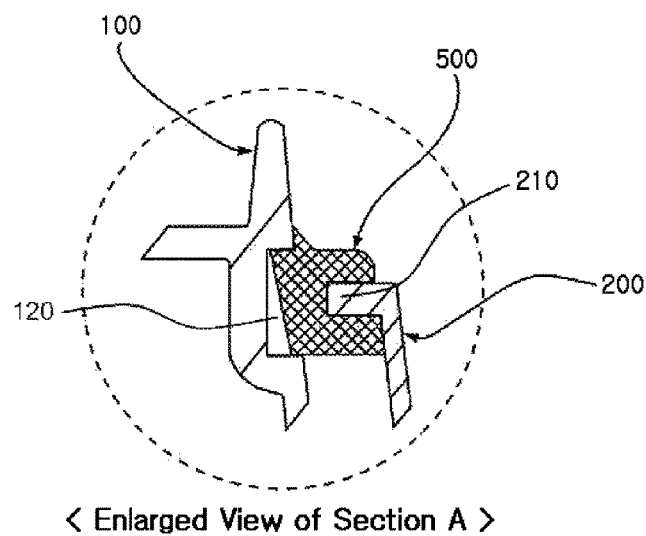
< Enlarged View of Section A >
[Fig. 3]
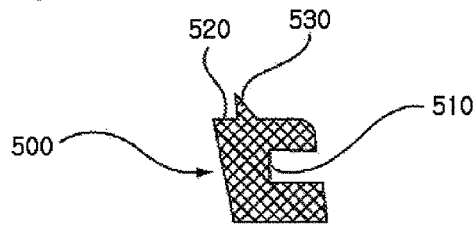

[Fig. 4]
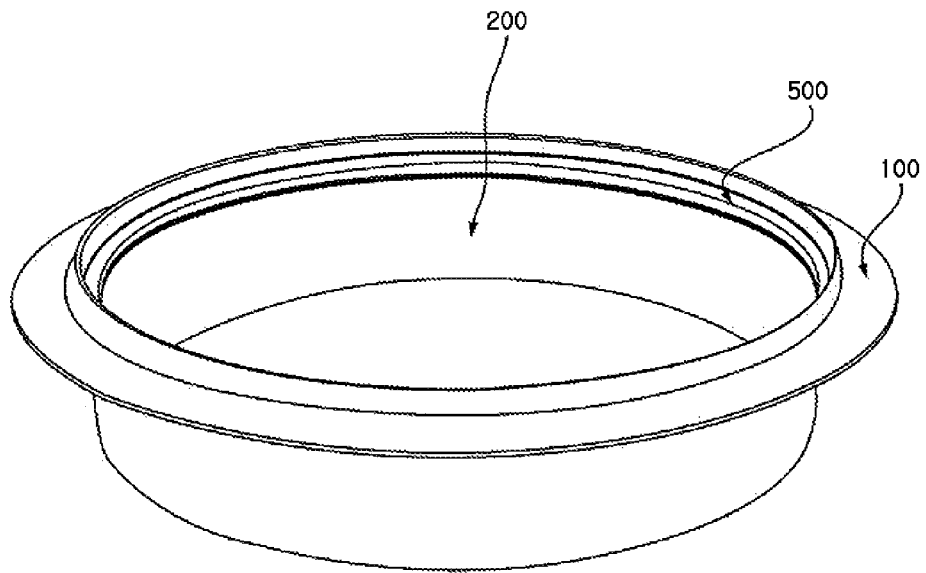
[Fig. 5]
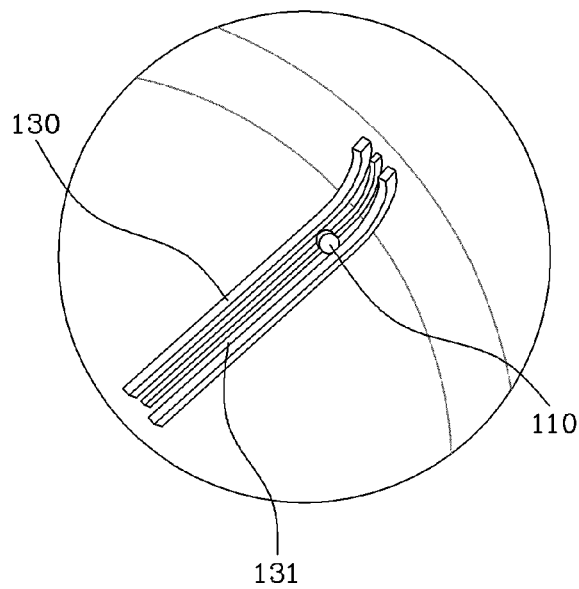

HEATING COOKER WITH SAFETY DEVICE FOR MICROWAVE OVEN

TECHNICAL FIELD

The present invention relates to a microwave oven cooker for cooking food using heat from a heating element and in which a pan, a heating sheet, and an insulating support are closely coupled to a main body.

BACKGROUND ART

A cooker for a microwave oven in which a pan, a heating sheet, and an insulating support are laminated on one another in a main body has been known in the art. The coupling between the pan and the main body was carried out in the following manner.

That is, the pan can be bonded onto a portion of an upper surface of the main body with silicone adhesive or the like, or otherwise the pan can be inserted at the circumference into an inner surface of the main body.

However, the silicone-bonding method had problems in that bonding and curing take a long time, hence lowering productivity, and because if the temperature of the pan exceeds a heat-resisting temperature limit of the silicone adhesive (260° C.) the silicone adhesive loses its adhesive property, and further because of direct heat transfer of the pan to the main body, the main body can be thermally damaged and sparks can occur.

Further, the inserting-coupling method also had problems such as the occurrence of thermal damage and sparks between the main body and the pan upon generating of high temperature heat.

Above all, known prior technologies had problems in that if a microwave oven is operated with a ventilation hole provided in the bottom of the main body of a cooker being clogged or closed, due to a user's carelessness, internal pressure in the main body increases and it causes an explosion of the main body, thereby damaging the microwave oven and the user's safety as well.

That is, while in the normal state, if the pressure of the main body rises sharply, pressure reduction will be performed by ventilation through the ventilation hole, but if the ventilation hole is clogged or closed off because of food remains or foreign material which are there due to carelessness of use and maintenance, an explosion may occur.

DISCLOSURE

Technical Problem

The present invention has been made to solve the foregoing problems with the prior art, and therefore an object of the present invention is to provide a heating cooker for a microwave oven equipped with a safety device of a structure, which, even when a ventilation hole is closed, enables pressure reduction to occur before it builds up enough to cause an explosion, and more evidently promotes implementing the pressure reduction via the ventilation hole as well.

Technical Solution

In order to accomplish the above object of the present invention, according to an aspect of the present invention, there is provided a heating cooker for a microwave oven in which in a main body through which microwaves are transmitted, an upper portion of a metallic pan is closely coupled, and a heating sheet receiving the microwaves and generating heat and an insulating support are coupled in order onto an undersurface of the pan, the heating cooker including a safety device configured such that a silicone packing is provided in a section of the close coupling between the pan and the main body, and if the internal pressure of the cooker rises sharply and exceeds a threshold value due to a clogging of the ventilation hole, the silicone packing is decoupled from the main body so as to reduce the pressure.

In one embodiment, the silicone packing may be provided with an inner circumferential groove, into which the circumference of the pan is inserted, and an outer upper, wedge-type protrusion which is fixedly fitted into a packing groove provided in the main body.

In an embodiment, the silicone packing may be further provided with a contact rib protruding from an upper surface thereof so as to come into close contact with an inner surface of the main body.

In an embodiment, the insulating support may be composed of a self-elastic ceramic wool material so that if pressure is applied from upside, it elastically supports the heating sheet and the pan upward.

In an embodiment, the main body may be provided with two or more ribs each protruding from the bottom thereof, and a ventilation hole communicating with outside is provided in a region between the ribs.

Advantageous Effects

According to the construction as set forth above, the heating cooker for a microwave oven of the present invention provides the effects of, even if the ventilation hole of the main body is clogged so that internal pressure rises abnormally, a pressure reduction being implemented before leading to an explosion, whereby an accident can be prevented from occurring and a loss of property due to the explosion can be avoided.

DESCRIPTION OF DRAWINGS

FIG. 1 is a schematic cross-sectional view illustrating a cooker according to the present invention;

FIG. 2 is an enlarged cross-sectional view of a section A illustrated in FIG. 1;

FIG. 3 is a cross-sectional view illustrating a silicone packing;

FIG. 4 is a perspective view illustrating an assembled cooker according to the present invention; and FIG. 5 is a partial perspective view illustrating an example of ribs and a ventilation hole provided in the bottom of a main body.

<Description of reference signs in the drawings>

| | |
|---|---|
| 100: Main Body | 110: Ventilation Hole |
| 120: Packing Groove | 130: Rib |
| 131: Ventilation Passage | 200: Pan |
| 210: Circumference | 300: Heating Sheet |
| 400: Insulating Support | 500: Silicone packing |
| 510: Circumferential Groove | 520: Protrusion |
| 530: Contact Rib | |

BEST MODE

Description will now be made of exemplary embodiments of the present invention with reference to the accompanying drawings as a means for assisting the understanding of the technical spirit of the present invention. However, since the given figures only illustrate preferred embodiments of the present invention, it should be understood that modified embodiments, e.g. simple structural changes, are included within the technical scope of the present invention.

Basically, according to the present invention, a heating cooker (hereinafter referred to as a 'cooker') for a microwave oven having a safety device includes a concave main body, a concave pan provided in the main body, and a planar heating sheet and an insulating support both provided between an upper surface of the bottom of the main body and a lower surface of the bottom of the pan. An empty space is provided between the main body and a side of the pan, and a silicone packing is used for connecting the pan and the main body.

The silicone packing is installed so as to be connected with an upper circumference of the pan and an inner packing groove of the main body, making an airtight seal between the pan and the main body. According to the present invention, the silicone packing is characterized in that if internal pressure of the empty space rises abnormally, it is decoupled from the packing groove, reducing the pressure.

Further, the present invention is also characterized in that the main body is provided with a plurality of ribs each protruding from the bottom thereof or a portion of the bottom and the side thereof so as to form a ventilation passage, and with a ventilation hole which communicates with the outside and is provided between the ribs so as to allow smooth pressure reduction therethrough.

Preferred embodiments will now be described in detail while referring to the accompanying drawings, wherein FIG. 1 is a schematic cross-sectional view illustrating a cooker according to the present invention, FIG. 2 is an enlarged cross-sectional view of a section A illustrated in FIG. 1, FIG. 3 is a cross-sectional view illustrating the silicone packing, FIG. 4 is a perspective view illustrating an assembled cooker according to the present invention, and FIG. 5 is a partial perspective view illustrating an example of ribs and a ventilation hole provided in the bottom of a main body.

As illustrated in the figures, a metallic pan 200 is installed in a main body 100 through which microwaves are transmitted, a heating sheet 300 receiving the microwaves and generating heat is provided on an undersurface of the pan 200, and an insulating support 400 is provided below the heating sheet 300.

Airtight coupling between the pan 200 and the main body 100 is implemented by a silicone packing 500 having inherent elasticity. In the state in which a ventilation hole 110 provided in the bottom of the main body 100 is clogged by the user's carelessness or the like, and if the cooker is operated and the internal pressure rises sharply, the inherently elastic silicone packing 500 is decoupled from a packing groove 120 of the main body 100, thereby reducing the pressure.

The main body 100 may be of one of a diversity of shapes such as a circle, a rectangle, etc., and has the continuous packing groove 120 on an upper inner surface thereof in order to receive the silicone packing 500. The silicone packing 500 is shaped like a ring corresponding to the shape of the main body 100, and is provided with an inner circumferential groove 510, in which the circumference 210 of the pan is inserted, and an outer upper, wedge-type protrusion 520 which is fixedly fitted into the packing groove 120 provided in the main body 100.

The packing groove 120 of the main body 100 may be of a shape similar to a '⊏' type and receives therein the protrusion 520 and the lower portion of the silicone packing 500 so as to couple the silicone packing.

Since the silicone packing 500 has inherent elasticity, when the silicone packing 500 is coupled with the pan such that the circumferential groove 510 is inserted onto the circumference 210 of the pan, and then pushed into the main body 100, it is moved in a compressed state downwards along the inner surface and is coupled into the packing groove 120 of the main body. That is, when the compressed silicone packing 500 arrives at the packing groove 120, the silicone packing expands to its original shape and is brought into close contact at the protrusion 520 with the packing groove 120, forming a coupled state.

More preferably, the silicone packing 500 is further provided with a contact rib 530 on the upper portion thereof in order to come into close contact with the inner surface of the main body, which is continuous with the packing groove 120, thereby enhancing the airtightness thereof. The contact rib 530 is provided for sealing a gap between the main body and the silicone packing and comes into contact with the inner surface of the main body 100, so that upon cooking, moisture or food waste is prevented from entering the packing groove 120 of the main body.

The heating sheet 300 provided below the pan 200 is a heating element for receiving microwaves and generating heat, but this element is a known element so its detailed description will be omitted.

The insulating support 400 provided below the heating sheet 300 is composed of an inherently elastic ceramic wool material, so that after assembly, if pressure is applied from the topside, the inherently elastic insulating support 400 generates repulsive force upwards so as to support the heating sheet 300 and the pan 200 upwards within a certain range, whereby the silicone packing 500 inserted into the packing groove 120 maintains its fixation without being loosened vertically.

Meanwhile, the inherently elastic silicone packing 500 may be of a hardness of 30 to 80 degrees, preferably, and the hardness can be properly selected according to the size of the main body and the cooking use.

Further, the silicone packing 500 is an electrically non-conductive member and thus serves to prevent electromagnetic waves flowing through the metallic pan 200 via microwave transmission from transmitting to the main body 100, whereby a sparking occurring in the metallic pan 200 due to the microwaves can be advantageously prevented from occurring.

One or more ventilation holes 110 are provided in the bottom of the main body 100 to provide pressure reduction. According to the present invention, a unique structure is employed in order to prevent the ventilation hole 110 from being clogged by the insulating support 400 provided on the bottom of the main body 100.

That is, the unique structure is configured such that two or more ribs 130 are provided on the bottom or a section extending from the bottom to a portion of the inner side surface of the main body 100, a space between the ribs 130 is defined as a ventilation passage 131, and the ventilation hole 110 is provided on a point along the ventilation passage 131. Such a structure including the ventilation passage 131, the ventilation hole 110, and the ribs 130 may be provided as one or more sets on the bottom, and if provided as two or more sets, they may be preferably provided in a symmetrical form.

Providing the plurality of ribs 130 on the bottom of the main body 100, the insulating support 400 cannot clog the ventilation passage 131 and the ventilation hole 110, so that even if the internal pressure of the space C defined by the sides of the main body 100 and the pan 200 rises, high pressure air effectively exits via the ventilation passage 131 and the ventilation hole 110. At the same time, moisture permeated via the ventilation hole upon washing can also be naturally drained.

Further, according to the present invention, when the pan 200 coupled with the silicon packing 500 is assembled with the main body 100, the assembly can be implemented while pressing with a dedicated pressing device, so that as compared to the conventional silicone-bonding method or inserting-method, the assembly is easy thereby improving productivity.

The operating principle of the present cooker will now be described.

If the cooker is placed in a microwave oven and the oven is operated in the state in which a user does not check whether the ventilation hole 110 provided in the bottom of the main body 100 is clogged or not, high temperature heat is generated by the heating sheet 300 and thus air in the space C between the main body 100 and the pan 200 expands to cause an abrupt increase in internal pressure.

If the internal pressure of the space C exceeds a threshold value, a portion of the silicone packing 500 coupled with the packing groove 120 becomes decoupled from the packing groove 120 due to internal pressure, reducing the internal pressure and thus preventing the occurrence of an explosion. At this time, the decoupling is implemented not on the whole of the silicone packing 500, but on a portion thereof, and the pressure reduction will be conducted via that portion, making the pressure reduction smooth.

Then, even if the silicone packing 500 is decoupled from the packing groove for pressure reduction, a user can push again and insert the silicone packing 500 into the packing groove 120 so as to implement re-coupling, so that it can be continuously used without buying it again.

Further, providing the ventilation passage 131 on the bottom of the main body 100 using the plurality of ribs 130, and providing the ventilation hole 110 in the ventilation passage 131, even upon formation of high pressure in the space C, a ventilation path of the high pressure air is secured via the ventilation hole 110 through the ventilation passage 131 defined by the ribs 130, whereby primary pressure reduction is obtained via the ventilation hole 110, which avoids making efforts to re-couple the silicone packing 500 with the packing groove 120, which have been decoupled. Of course, if the pressure reduction via the ventilation hole 110 is not sufficient, the silicone packing 500 can be decoupled from the packing groove for secondary pressure reduction.

Comparative test examples on pressure reduction characteristics using the cookers will now be described.

A test was carried out on objective samples of cookers in order to investigate the explosion of the main body and the ventilation effects of the expended air.

TEST 1: Explosion Test of the Main Body
1) Preparation
(1) Silicone-bonding type cooker for a microwave oven (prior art), in which the coupling between the main body and the circumference of the pan is of a silicone-bonding method.
(2) Inserting-coupling type cooker for a microwave oven (prior art) in which the coupling between the main body and the circumference of the pan is of an inserting-coupling method.
(3) Silicone packing structure cooker for a microwave oven (present invention).

In the test, the ventilation holes of the objective three cookers (1), (2), and (3) were clogged forcefully under the same conditions and method. (That is, the ventilation holes of the cookers were clogged, assuming that they may be clogged with food waste or the like by a user's carelessness)

2) Test Method
250 ml water was poured into the pans of the cookers (1), (2), and (3), and the cookers were heated for 10 to 15 minutes using a microwave oven.
The microwave oven: a rated RF power of 700 W 3) Results
The prior art cookers (1) and (2) were blown up with the explosion in the microwave oven, and a glass plate of the oven, the main body and the pan were broken. However, the present cooker (3) was not blown up, and the silicone packing was partially decoupled from the main body due to the internal pressure of the space, so that there was no occurrence of damage in the product and the microwave oven.

The reason that a time to explosion ranged from between 10 minutes and 15 minutes and was not constant was because the time depended on the heat generating power of the heating sheet, and as the heating sheet had higher performance (i.e., higher heat generating power), the time to explosion became shortened.

TEST 2: Ventilation Effects of the Ventilation Hole with the Ventilation Passage
1) Preparation
(1) Comparative cooker with a silicone packing in which a rib and a ventilation passage 24 are not provided on the bottom of the main body, but only a ventilation hole 23 is punctured in the bottom.
(2) Present cooker with a silicone packing 1 in which a rib, a ventilation passage and a ventilation hole are provided on the bottom of the main body.
The insulating supports used in those cookers (1) and (2) were prepared in a state of being intentionally wet and stained with oil (because they are used in a cooker and therefore are usually used in a state of being wet and stained with oil due to the user's carelessness during cooking).

2) Test Method
250 ml water was poured into the pans of the cookers (1) and (2), and the cookers were heated for 20 to 30 minutes using a microwave oven.
The microwave oven: a rated RF power of 700 W 3) Results
In the case of the cooker (1), although the ventilation hole was provided, moisture and oil stain hindered ventilation through the insulating support of ceramic wool material, so that the expanded air was not completely (100%) vented, and the space was thermally expanded by the internal pressure, whereby the silicone packing was decoupled from the main body.

However, in the present cooker (2), although moisture and oil stain hindered the ventilation of the insulating support of the ceramic wool material, 100% of the expanded air was completely vented, so that the space was not thermally expanded and thus the silicone packing 1 was not decoupled from the main body 2.

3. CONCLUSION
It was verified that the present cooker having the silicone packing 1 and the ventilation hole 23 with the ventilation passage 24 is of the safest structure and does not cause explosion and decoupling of the silicone packing.

INDUSTRIAL APPLICABILITY

The cooker of the present invention has excellent safety and is expected to be widely used as a cooker for a microwave oven while replacing existing products, providing very high availability.

The invention claimed is:

1. A heating cooker for a microwave oven, comprising:
   a main body through which microwaves are transmitted, the main body having a bottom wall and a sidewall extending upwardly from the bottom wall, the bottom wall having an upper surface and a lower surface;
   a metallic pan, the metallic pan having a bottom wall and a sidewall extending upwardly from the bottom wall, the bottom wall having an upper surface and a lower surface, an upper portion of the metallic pan closely coupled with the main body;
   a heating sheet disposed below the metallic pan for receiving the microwaves and generating heat, the heating sheet being in contact with the metallic pan;
   an insulating support having elasticity and disposed between the heating sheet and the main body, wherein the insulating support has a lower surface contacting the upper surface of the bottom wall of the main body, and an upper surface of the insulating support contacting the lower surface of the bottom wall of the metallic pan and a lower surface of the heating sheet and a side surface of the heating sheet to secure the heating sheet to the metallic pan by an upward elastic force thereof and to reduce heat transfer to the main body;
   a ventilation hole provided in a bottom of the main body and communicating with outside;
   a packing groove provided in the main body and spaced below a top edge of the sidewall of the main body, the packing groove having an upper surface, a lower surface and an inner surface extending between the upper surface of the packing groove and the lower surface of the packing groove; and
   a silicone packing having an elasticity provided in a section of a close coupling between the metallic pan and the main body, the silicone packing having an upper surface, a lower surface, an inner surface and an outer surface,
   wherein the upper surface of the silicone packing contacts the upper surface of the packing groove and the lower surface of the silicone packing contacts the lower surface of the packing groove such that the packing groove receives the silicone packing,
   wherein the silicone packing includes a circumferential groove in the inner surface of the silicone packing and located between the upper surface of the silicone packing and the lower surface of the silicone packing and into which a circumference of the sidewall of the metallic pan is inserted, and
   wherein, when the heating cooker is operated, if an internal pressure of a space between the metallic pan and the main body rises over a threshold value due to a clogging of the ventilation hole, the silicone packing is configured to be decoupled from the packing groove of the main body so as to reduce the internal pressure.

2. The heating cooker according to claim 1, wherein the outer surface of the silicon packing has a wedge-shape so that a space is formed between the outer surface of the silicone packing and the inner surface of the packing groove, a width of the space at the lower surface of the packing groove being greater than the width of the space at the upper surface of the packing groove.

3. The heating cooker according to claim 2, wherein the silicone packing is further provided with a contact rib protruding from the upper surface of the silicone packing so as to come into close contact with the sidewall of the main body.

4. The heating cooker according to claim 1, wherein the insulating support is composed of an inherently elastic ceramic wool material so that if pressure is applied from topside, the insulating support elastically supports the heating sheet and the metallic pan upwards.

5. The heating cooker according to claim 4, wherein the main body is provided with two or more ribs each protruding upwardly from the bottom wall of the main body, and
   wherein the ventilation hole is provided in a region between the two or more ribs in order to prevent the ventilation hole from being clogged by the insulating support.

6. The heating cooker according to claim 2, wherein the insulating support is composed of an inherently elastic ceramic wool material so that if pressure is applied from topside, the insulating support elastically supports the heating sheet and the metallic pan upwards.

7. The heating cooker according to claim 3, wherein the insulating support is composed of an inherently elastic ceramic wool material so that if pressure is applied from topside, the insulating support elastically supports the heating sheet and the metallic pan upwards.

8. The heating cooker according to claim 6, wherein the main body is provided with two or more ribs each protruding upwardly from the bottom wall of the main body, and
   wherein the ventilation hole is provided in a region between the two or more ribs in order to prevent the ventilation hole from being clogged by the insulating support.

9. The heating cooker according to claim 7, wherein the main body is provided with two or more ribs each protruding upwardly from the bottom wall of the main body, and
   wherein the ventilation hole is provided in a region between the two or more ribs in order to prevent the ventilation hole from being clogged by the insulating support.

10. A heating cooker for a microwave oven, comprising:
    a main body through which microwaves are transmitted, the main body having a bottom wall and a sidewall extending upwardly from the bottom wall, the bottom wall having an upper surface and a lower surface;
    a packing groove provided in the sidewall of the main body and spaced below a top edge of the sidewall of the main body, the packing groove having an upper surface, a lower surface and an inner surface extending between the upper surface of the packing groove and the lower surface of the packing groove;
    a pan having a bottom wall and a sidewall extending upwardly from the bottom wall, the bottom wall having an upper surface and a lower surface;
    a heating sheet disposed below the pan for receiving the microwaves and generating heat, the heating sheet being in contact with the pan;
    an insulating support having elasticity and disposed between the heating sheet and the main body, wherein the insulating support has a lower surface contacting the upper surface of the bottom wall of the main body, and an upper surface contacting the lower surface of the pan and a lower surface of the heating sheet and a side surface of the heating sheet to secure the heating sheet to the pan by an upward elastic force thereof and to reduce heat transfer to the main body;

a ventilation hole provided in a bottom of the main body and communicating with outside; and a silicone packing having an elasticity attached to the sidewall of the pan and engaging the packing groove, the silicone packing having an upper surface, a lower surface, an inner surface and an outer surface, wherein the upper surface of the silicone packing contacts the upper surface of the packing groove and the lower surface of the silicone packing contacts the lower surface of the packing groove such that the packing groove receives the silicone packing, wherein the silicone packing includes a circumferential groove in the inner surface of the silicone packing and located between the upper surface of the silicone packing and the lower surface of the silicone packing into which a circumference of the sidewall of the pan is inserted, and wherein, when the heating cooker is operated, if an internal pressure of a space between the pan and the main body rises over a threshold value due to a clogging of the ventilation hole, the silicone packing disengages from the packing groove so as to reduce the internal pressure.

11. The heating cooker according to claim 10, wherein the silicone packing is further provided with a contact rib protruding from the upper surface of the silicone packing so as to come into close contact with an inner surface of the main body.

12. The heating cooker according to claim 10, wherein the insulating support is composed of an inherently elastic ceramic wool material so that if pressure is applied from topside, the insulating support elastically supports the heating sheet and the pan upwards.

13. The heating cooker according to claim 10, wherein the main body is provided with two or more ribs each protruding upwardly from the bottom wall of the main body, and wherein the ventilation hole is provided in a region between the two or more ribs in order to prevent the ventilation hole from being clogged by the insulating support.

14. The heating cooker according to claim 1, wherein the insulating support is a sheet of material occupying an entire space between an the upper surface of the bottom wall of the main body and the lower surface of the heating sheet.

15. The heating cooker according to claim 14, wherein the insulating support is larger than the heating sheet so as to extend beyond the side surface of the heating sheet.

16. The heating cooker according to claim 1, wherein the insulating support is a single sheet of material.

17. The heating cooker according to claim 10, wherein the insulating support is a sheet of material occupying an entire space between the upper surface of the bottom wall of the main body and the lower surface of the heating sheet.

18. The heating cooker according to claim 17, wherein the insulating support is larger than the heating sheet so as to extend beyond the side surface of the heating sheet.

19. The heating cooker according to claim 10, wherein the insulating support is a single sheet of material.

20. The heating cooker according to claim 10, wherein the outer surface of the silicon packing has a wedge-shape so that a space is formed between the outer surface of the silicone packing and the inner surface of the packing groove, a width of the space at the lower surface of the packing groove being greater than the width of the space at the upper surface of the packing groove.

\* \* \* \* \*